United States Patent
Adams, Jr.

[11] Patent Number: 5,830,351
[45] Date of Patent: Nov. 3, 1998

[54] BIOMASS CONDITIONER

[75] Inventor: Carl E. Adams, Jr., 201 Summit View Dr., Suite 313, Brentwood, Tenn. 37027

[73] Assignee: Carl E. Adams, Jr., Brentwood, Tenn.

[21] Appl. No.: 599,599

[22] Filed: Feb. 8, 1996

[51] Int. Cl.$^6$ ................................................ C02F 3/12
[52] U.S. Cl. .................................. 210/195.3; 210/195.4; 210/202; 210/207; 210/626
[58] Field of Search ........................... 210/195.1, 195.3, 210/195.4, 202, 205, 207, 220, 255, 256, 258, 259, 626

[56] References Cited

U.S. PATENT DOCUMENTS

| | | |
|---|---|---|
| 1,009,857 | 11/1911 | Reisert . |
| 1,962,430 | 7/1934 | Currie . |
| 2,195,408 | 4/1940 | Downes . |
| 2,540,474 | 2/1951 | Cox . |
| 2,574,685 | 11/1951 | Baxter et al. ............................ 210/626 |
| 2,889,929 | 6/1959 | Kivell . |
| 3,053,390 | 9/1962 | Wood . |
| 3,206,032 | 9/1965 | Nottingham et al. ................ 210/195.3 |
| 3,224,964 | 12/1965 | Derenk et al. ........................... 210/626 |
| 3,246,762 | 4/1966 | Sontherimer et al. ............... 210/195.3 |
| 3,355,023 | 11/1967 | Foster .................................... 210/195.4 |
| 3,385,444 | 5/1968 | Dufournet ............................ 210/195.4 |
| 3,412,017 | 11/1968 | Abson et al. ........................ 210/195.3 |
| 3,459,303 | 8/1969 | Bradley ................................. 210/195.3 |
| 3,772,187 | 11/1973 | Othmer ................................. 210/195.3 |
| 3,872,003 | 3/1975 | Walker ................................. 210/195.3 |
| 4,287,070 | 9/1981 | Pollock ................................... 210/220 |

OTHER PUBLICATIONS

By United Industries, Inc., "The Boat Clarifier", Publication No. 988BC, pp. 1 –10, Date Unknown.
By Mixing Equipment Co., Inc., "Lightnin Treatment Systems", 1977.
By Hoechst, "The BIOTECH Reactor State of the Art in Biological Waste Water Treatment" Brochure 8708/035E, Date Unknown.
By Unknown, "Paper Mill Cleans Up Hard–Working River", *Engineering News–Record*, pp. 24–26, Aug. 1, 1963.

*Primary Examiner*—Christopher Upton
*Attorney, Agent, or Firm*—Daniel V. Thompson

[57] ABSTRACT

A wastewater treatment system has at least one treatment chamber and at least one settling chamber. An influent conduit connects the treatment chamber to a source of wastewater. A pump is provided for transferring treated wastewater, the treated wastewater being a water/biomass mixture, from the treatment chamber to the settling chamber by way of a transfer conduit. An effluent conduit removes treated wastewater from the settling chamber. A treatment system is provided for treating water in the treatment chamber. A biomass conditioner in the transfer conduit conditions the biomass by removing energy from the water/biomass mixture.

1 Claim, 3 Drawing Sheets

BIOMASS CONDITIONER

TECHNICAL FIELD

This invention relates to wastewater treatment systems, and more particularly to a system having a conduit transferring treated wastewater to a settling chamber.

DESCRIPTION OF THE PRIOR ART

One commonly used wastewater treatment system uses what is known as the "activated sludge" process. The conventional activated sludge process consists of at least one treatment (typically by aeration) basin and at least one separate, secondary treatment sludge settling, or "clarification", system. FIG. 1 is an illustration of a typical conventional system in its simplest form, consisting, by way of example, of a rectangular aeration basin 1 and a circular, center-feed clarifier 2. Influent wastewater enters basin 1 at conduit 3, where it is aerated by aeration system 4. Biological processes treat the water in basin 1 by converting organic pollutants to a stable, odorless and harmless solid known as "biomass" or simply "activated sludge". The effluent from basin 1 is conducted to clarifier 2 by way of conduit 5. Conduit 5 empties into the center well 6 of the clarifier. Biomass settles out of the water by way of gravity and is conveyed to the center by scraper arms 7. Pumps 8 return and recycle at least a portion of the thickened underflow biomass to the aeration basin 1 to maintain the biological treatment process. Clarified, treated effluent is taken from clarifier 2 at effluent overflow weir 9.

The clarifier 2 has proven to be a critical link in the operating success of the activated sludge system. The clarifier must serve four major functions:

1. Provide adequate surface area and quiescent settling conditions, both horizontally and vertically within the clarifier, to allow horizontal separation of the biomass sludge from the treated effluent wastewater.

2. Provide residence time and bottom surface area adequate to allow the settling biomass to thicken, such that return recycle rates are sufficiently low to prevent unnecessary underflow currents in the clarifier.

3. Provide a reliable method of biomass withdrawal that will minimize short-circuiting of diluted biomass and permit withdrawal of optimally concentrated material.

4. Allow rapid withdrawal of biomass to minimize anoxic/septic conditions which may result in dentrification within the clarifier or odors in the biomass handling area.

A drawback of the conventional system involves the transport of wastewater/solids from the aeration basin to the clarifier, in the conduit 5 described above. It has been found that clarification and overall treatment is significantly enhanced if energy is removed from the influent to the clarifier before it enters the center well.

SUMMARY OF THE INVENTION

The present invention eliminates the drawbacks of the prior treatment systems by integrating a biomass conditioner into the conduit between the treatment basin and clarifier. The preferred biomass conditioner includes an air dispersion chamber, a baffled transition channel and a cascading flocculator.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
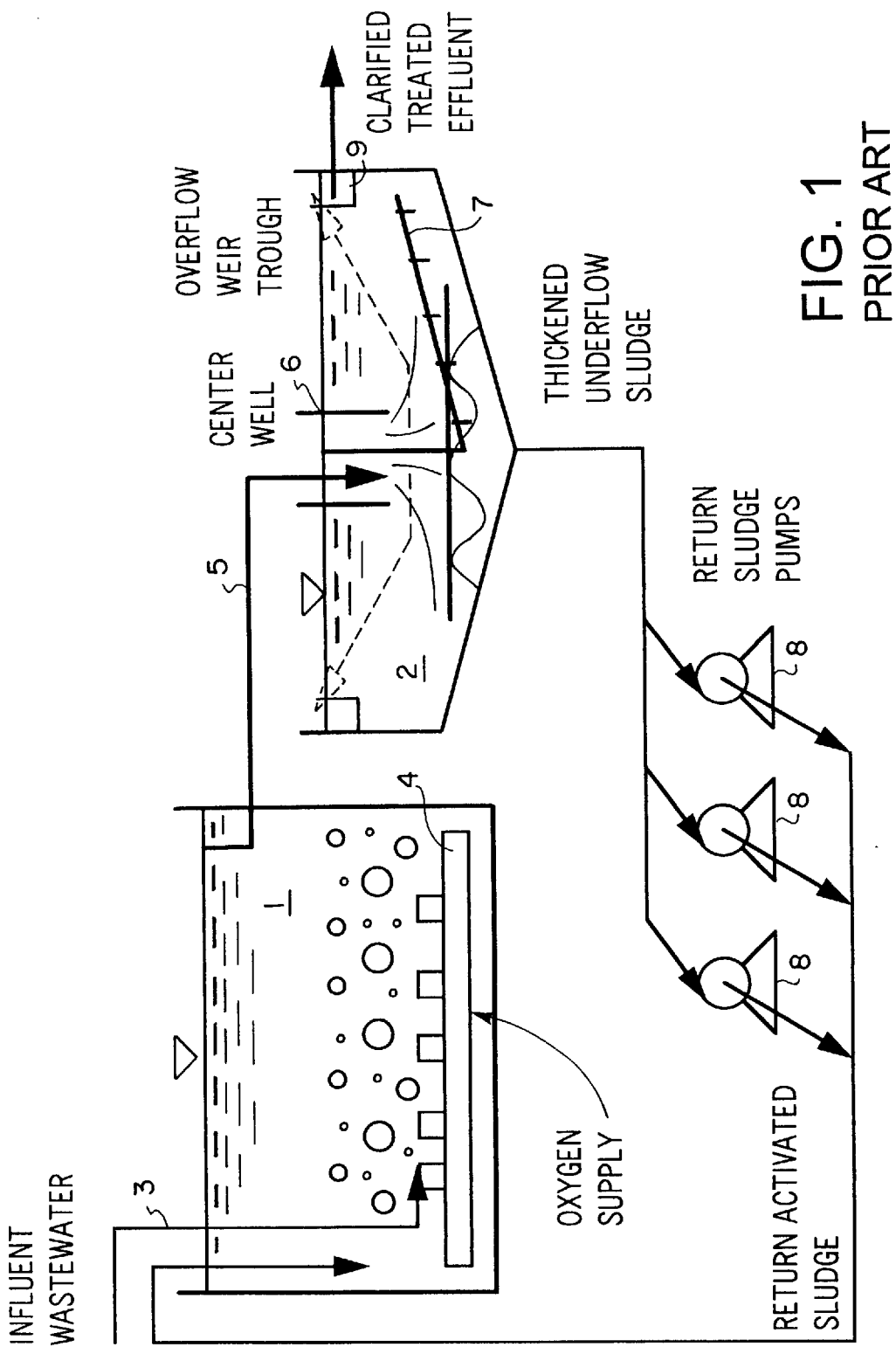
FIG. 1 is schematic view of a prior art activated sludge system.
Figure 2:
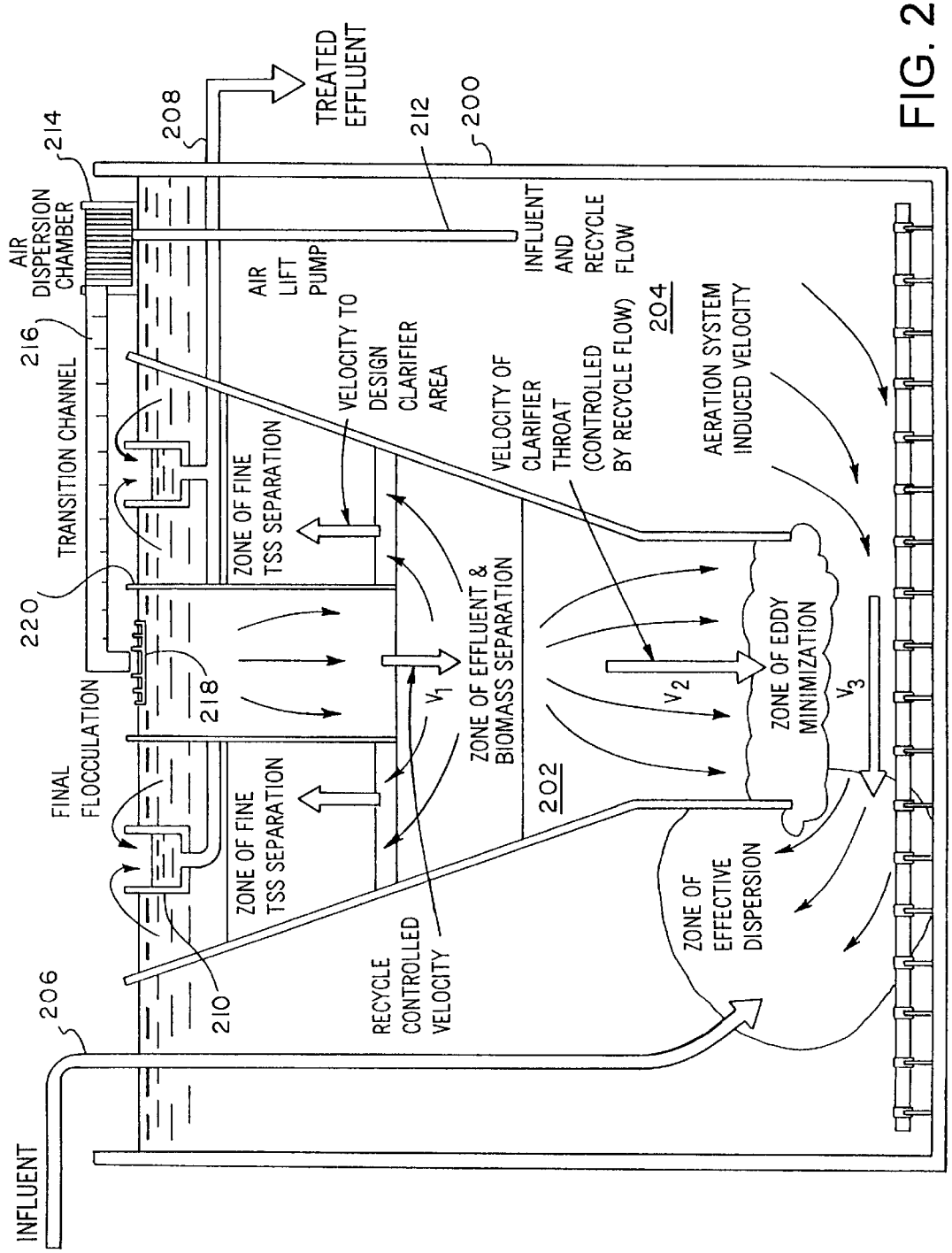
FIG. 2 is a schematic view of an integral activated sludge system constructed in accordance with the invention.
Figure 3:
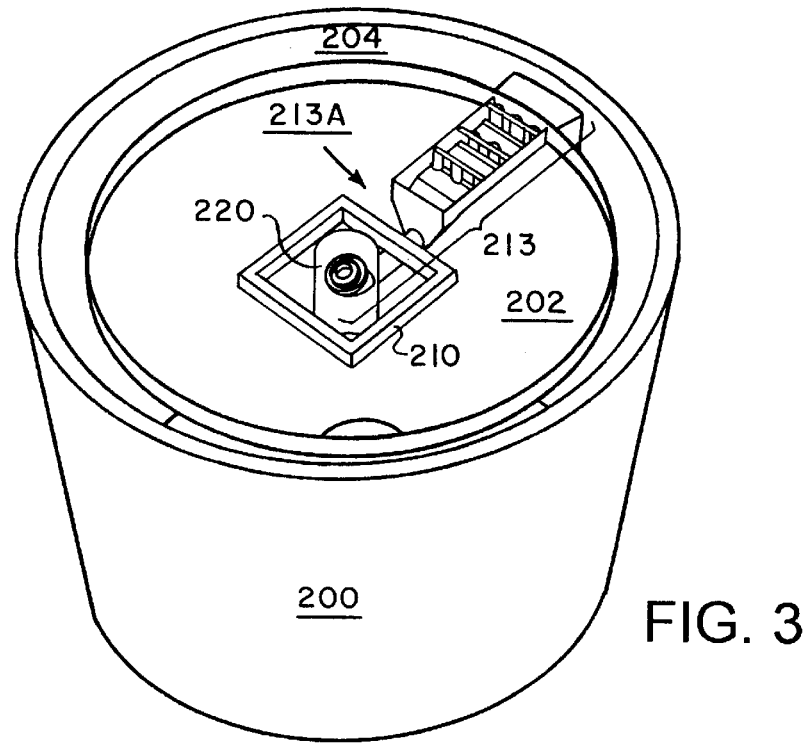
FIG. 3 is a perspective view of the system of FIG. 2.
Figure 4:
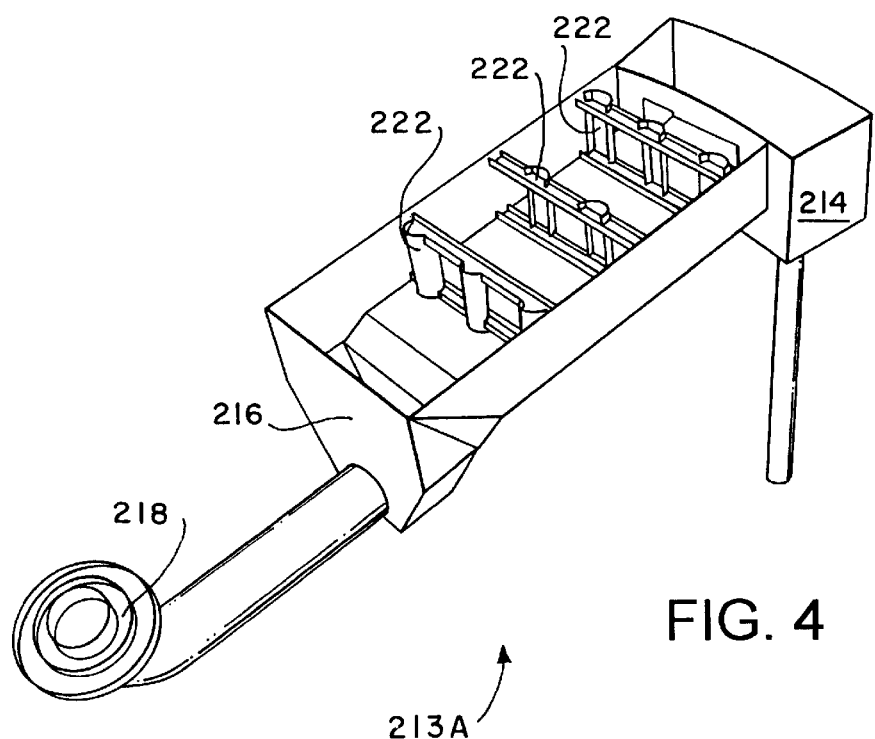
FIG. 4 is an enlarged partial view of the biomass conditioner in FIG. 3.

Referring to FIGS. 2 through 4, where like numerals indicate like and corresponding elements, a vessel 200 is divided into a settling chamber 202 and a treatment chamber 204. Influent enters the treatment chamber through conduit 206, while effluent exits the system through conduit 208. Influent is taken from the top of settling chamber 202 by weir 210.

Air lift pump 212 provides recycle flow through a transfer conduit 213 having a biomass conditioner 213A of the present invention. Biomass conditioner 213A includes air dispersion chamber 214, transition channel 216, and final flocculation apparatus 218. The air dispersion chamber 214, transition channel 216 and final flocculation apparatus 218 are arranged in a linear flow relationship in that specific order, as best shown in FIG. 4. Recycle flow enters center well 220. Preferably, flocculation apparatus 218 is a cascading flocculator having circular cross-sections, as shown.

Air Dispersion Chamber 214: The objective is to remove readily-free air from the water-biomass mixture. Retention time in air dispersion chamber 214 may vary from 10 seconds to two minutes. Air dispersion chamber 214 may include baffling and/or flow directing panels depending on configuration, retention time, and aeration power level in aeration chamber 204.

Generally, the air dispersion chamber 214 is designed to remove 30–60 percent of the energy from the aeration chamber 204 and air lift pump 212. The energy dissipation is accomplished by creating head loss with baffles and panels within air dispersion chamber 214.

Transition Channel 216: The objectives are to further reduce energy from aeration/air lift system, manipulate remaining air bubbles out of biomass flocs, and to initiate flocculation of the biomass. Various configurations of baffles can be used to accomplish that objective. Either reverse flow or over/under baffling can be used successfully. However, the most effective devices seem to be semi-circular baffles 222, as shown, capable of being installed either into or against the flow to achieve: a. Laminar turbulence and b. Back-eddy turbulence.

In one example semi-circular baffles 222 were installed during startup and adjusted on-site to maximize efficiency. Approximately, an additional 20 to 30 percent of the system energy was dissipated.

Final Flocculation Apparatus 218: The objectives are to complete the flocculation process and to ensure even distribution across the center well 220. The remaining energy is dissipated (approximately 90–95 percent maximum) and the nature of the static flocculator encourages the biomass plus, any added chemicals (polymers etc.), to form compact dense flocs that settle well with minimum dispersed TSS.

In operation, biomass conditioner 213 is in keeping with my philosophy that the more conditioned the biomass prior to entering the downward movement in the center well, the better the settling, clarity and thickening of the activated sludge. Intensive research efforts have led to the concept of "transitioning floc conditioning" prior to entering the center well of the clarifier. This conditioning disperses all entrained air carried from the aeration basin and methodically transitions from air dispersion to gentle flocculation of the biomass. Each Biomass Conditioner is manufactured and calibrated to maintain maximum air dispersion/biomass flocculation over a wide range of flows expected in the site specific design.

Whereas, the present invention has been described with the respect to a specific embodiment thereof, it will be understood that various changes and modifications will be suggested to one skilled in the art, and it is intended to encompass such changes and modifications as fall within the scope of the appended claims.

I claim:

1. A wastewater treatment system, comprising:

at least one treatment chamber and at least one settling chamber;

an influent conduit connecting the treatment chamber to a source of wastewater;

a pump for transferring treated wastewater, the treated wastewater being a water/biomass mixture, from the treatment chamber to the settling chamber by way of a transfer conduit;

an effluent conduit for removing treated wastewater from the settling chamber;

a treatment system for treating water in the treatment chamber;

a biomass conditioner in the transfer conduit to condition the biomass by removing energy from the water/biomass mixture;

where the pump is an air lift pump and with the biomass conditioner first including an air dispersion chamber to remove readily-free air from the biomass entering the biomass conditioner;

with the biomass conditioner next including a transition channel adapted to receive biomass from the air dispersion chamber, the transition channel having baffles to remove air bubbles from the water/biomass mixture, reduce the energy thereof, and initiate flocculation;

with the biomass conditioner next including a final flocculator adapted to receive biomass from the transition channel, the final flocculator adapted to complete flocculation and ensure even distribution across the settling basin; and the air dispersion chamber, transition channel and final flocculator being arranged in a linear flow relationship in that specific order.

* * * * *